UNITED STATES PATENT OFFICE.

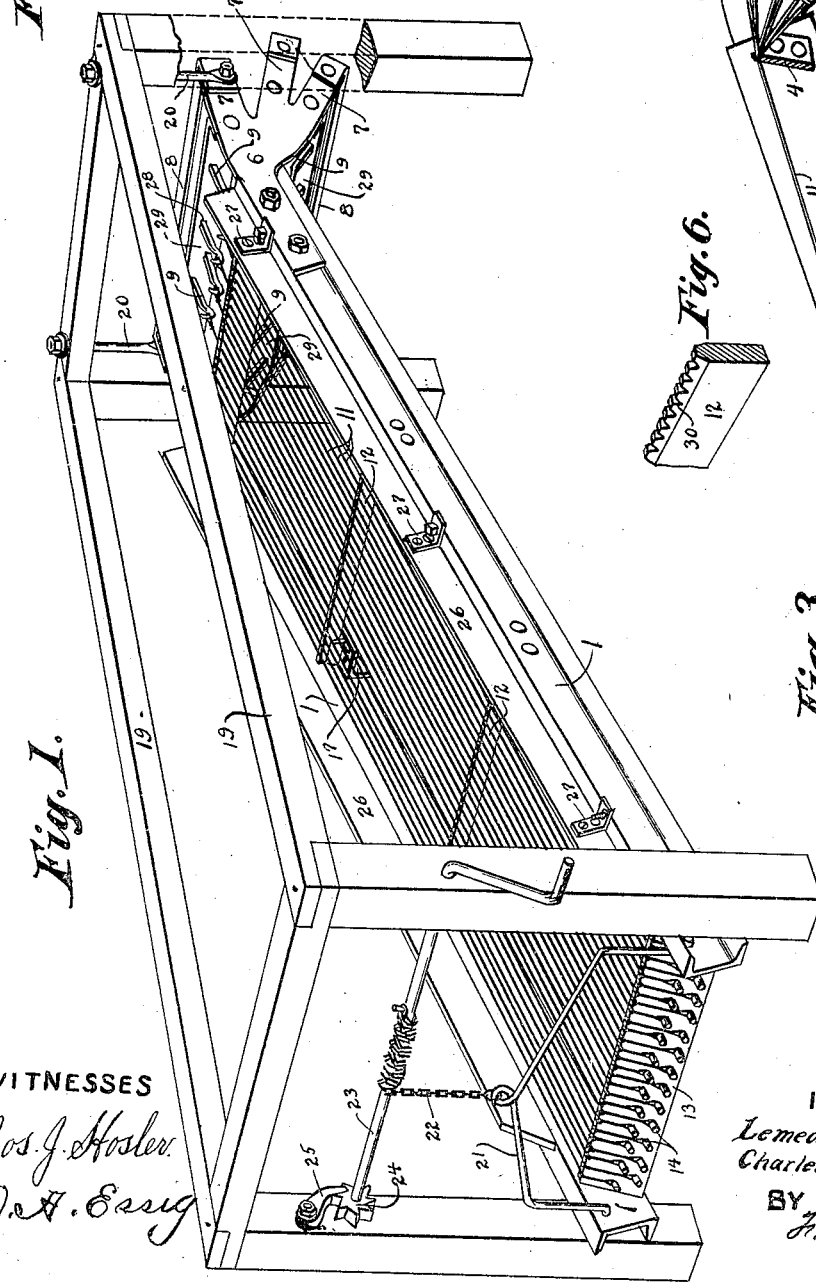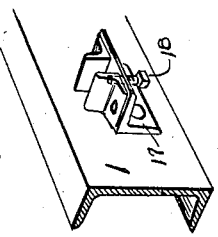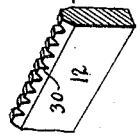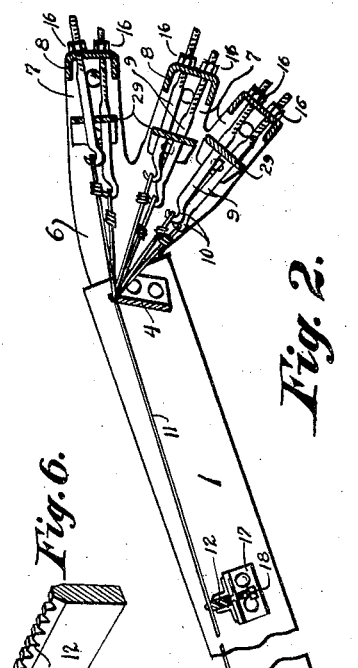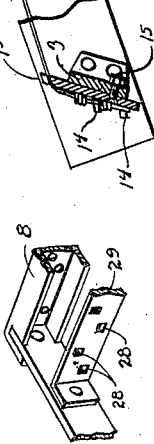

LEMEON P. SHAFER AND CHARLES DEVIS, OF CANTON, OHIO.

SAND OR CLAY SCREEN.

No. 810,682.          Specification of Letters Patent.          Patented Jan. 23, 1906.

Application filed April 3, 1905. Serial No. 253,611.

*To all whom it may concern:*

Be it known that we, LEMEON P. SHAFER and CHARLES DEVIS, citizens of the United States, residing at Canton, in the county of Stark and State of Ohio, have jointly invented certain new and useful Improvements in Sand or Clay Screens; and we do hereby declare that the following is a full, clear, and exact description of the same, reference being had to the annexed drawings, making a part of this specification, and to the figures of reference marked thereon, in which—

Figure 1 is a perspective view showing the screen properly suspended. Fig. 2 is a longitudinal section taken at a point between the side members of the screen-frame. Fig. 3 is a view showing a portion of the tension-head and portions of one of the tension-bars and one of the stay-bars. Fig. 4 is a transverse section showing a portion of one of the side members of the screen-frame, showing a side plate secured thereto. Fig. 5 is a view showing a portion of one of the side members of the screen-frame and illustrating one of the bridge-bar brackets and adjusting-screw. Fig. 6 is a detached view showing a portion of one of the bridge-bars.

The present invention has relation to sand or clay screens; and it consists in the novel construction hereinafter described, and particularly pointed out in the claims.

Similar numerals of reference indicate corresponding parts in all the figures of the drawings.

In the accompanying drawings, 1 represents the side members of the screen-frame, which are preferably formed of channel-iron and are held in proper spaced relation to each other by the tie-bars 3 and 4, which tie-bars are located near the ends of the side members 1 and secured thereto in such a manner as to produce a rigid rectangular screen-frame when the parts just above mentioned are secured together by suitable rivets or otherwise. It will be understood that the side members 1 and the tie-bars 3 and 4 may be formed of such lengths that they will produce a screen-frame of the desired size, reference being had to the particular use to which the screen is to be applied. To the side members 1 are attached the tension-heads 6, which tension-heads are provided with the divided extensions 7, to which extensions the tension-bars 8 are attached, substantially as illustrated in Fig. 3. The screen and holding-bars 9 are provided with the hooked ends 10, to which hooked ends are attached the screen-wires 11, which screen-wires pass over the tie-bars 4, the bridge-bars 12, and the bar 13 and are attached to the holding-pins 14, which holding-pins are properly connected in any convenient and well-known manner to the bar 13 or its equivalent. The bar 13 is held in fixed position upon the tie-bar 13 by means of the lug-bolts 15 or their equivalents; but this construction is immaterial so far as detail is concerned, inasmuch as the only object designed to be accomplished is to provide a suitable stay-bar for the side members of the frame and a suitable screen-wire-holding bar. In clay-screens of the class described it is important that each screen-wire 11 is provided with a separate and independent tension device, so that all of the wires may be brought to a uniform tension regardless of any variation as to the stretching of the different wires. In order to provide a separate tension for each wire, the wire-holding bars 9 are provided and a bar is provided for each and every wire and each bar is screw-threaded at their outer ends, which screw-threaded portions extend through the tension-bars 8 and have located thereon nuts 16, by which arrangement the bars 9 can be moved endwise by the rotation of the nuts. In order to provide room for the bars 9, the tension-bars 8 are spaced from each other, as illustrated in Figs. 1 and 2, and by spacing the tension-bars sufficient room is provided for the screen-wire-holding bars 9 and their nuts 16. For the purpose of supporting the bridge-bars 12 the brackets 17 are provided, which brackets are secured to the side members 1 of the screen-frame, substantially as illustrated in Fig. 5, and for the purpose of bringing the bridge-bars 12 into proper adjustment with reference to the screen-wires 11 the adjusting-screws 18 are provided, which adjusting-screws are located through screw-threaded apertures formed in the brackets 17 and their upper ends brought in contact with the under edges of the bridge-bars 12.

For the purpose of suspending the screen proper a frame, such as 19, may be provided and the head end of the screen held by the rods 20 and the delivery end by the bail 21, the chain 22, and the crank-shaft 23. For the purpose of adjusting the angularity of the screen the chain 22 is wound around the shaft 23, and by rotating the shaft in one direction the delivery end of the screen will be elevated, and by rotating said shaft in the opposite direction the delivery end of the screen will be lowered, and when the screen is brought into proper position the shaft 23 is held against rotation by means of the ratchet 24 and the dog 25.

For the purpose of holding the material upon the screen-wires the side boards 26 are provided, which side boards are held in proper relative position by means of the brackets 27. For the purpose of preventing the screen-wire-holding bars 9 from rotating during the time the nuts 16 are rotated their non-screw-threaded portions are formed angular and the angular portions located through the angular apertures 28, formed in the stay-bars 29, which stay-bars also serve the purpose of holding the bars 9 in proper relative position, said bars being secured to the tension-head 6 or the arms 7 of the tension-head.

We have illustrated the tension-head provided with the divided extensions 7; but this is simply done for the purpose of lightening the device, as the only object is to provide means for spacing the tension-bars 8 from each other.

For the purpose of holding the screen-wires 11 in proper relation with reference to each other the tie-bars and the bridge-bars, over which the wires are passed, are provided with notches 30 and the wires seated in the notches.

Having fully described our invention, what we claim as new, and desire to secure by Letters Patent, is—

1. In a screen of the class described, the combination of a suitable frame, consisting of side members and tie-bars, heads carried by the frame said heads provided with tension-bars and the tension-bars located in different horizontal planes, wire-holding bars secured to said tension-bars and independently adjustable, a series of screen-wires secured to the independently-adjustable holding-bars at one of their ends and their opposite ends secured in fixed position and means for holding the screen-wires in spaced relation with each other, substantially as and for the purpose specified.

2. In a screen of the class described, the combination of a suitable frame, the side members of said frame consisting of channel-bars, means for holding the side members in proper spaced relation, a tension-head provided with tension-bars, said tension-bars located in different horizontal planes, a series of screen-wires held in fixed relation with reference to the frame at one of its ends, said screen-wires secured to independent adjustable wire-holding bars at their opposite ends, said adjustable wire-holding bars located in series and in different planes, and a bridge-bar located intermediate the ends of the screen-wires, and means for adjusting the bridge-bar to and from the screen-wires, substantially as and for the purpose specified.

In testimony that we claim the above we have hereunto subscribed our names in the presence of two witnesses.

LEMEON P. SHAFER.
CHARLES DEVIS.

Witnesses:
  J. A. JEFFERS,
  F. W. BOND.